Figure 1:
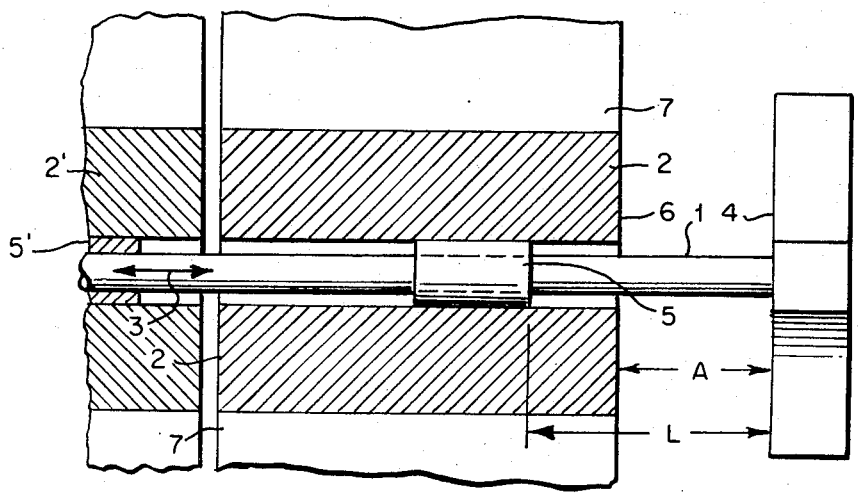

United States Patent [19]
van der Horst

[11] 3,836,210
[45] Sept. 17, 1974

[54] SHAFT BEARING ASSEMBLY OF A MACHINE TOOL

[75] Inventor: Eberhard van der Horst, Ekelenz, Germany

[73] Assignee: A. Monforts, Monchengladbach, Germany

[22] Filed: Oct. 10, 1972

[21] Appl. No.: 296,184

Related U.S. Application Data

[63] Continuation of Ser. No. 99,576, Dec. 18, 1970, abandoned.

[52] U.S. Cl............................................... 308/4 R
[51] Int. Cl. .......................................... F16c 17/00
[58] Field of Search............. 308/4 R, 3 R, 3 A, 36; 29/49 T

[56] References Cited
UNITED STATES PATENTS

| | | | |
|---|---|---|---|
| 1,403,583 | 1/1922 | Adams | 92/31 |
| 2,126,405 | 8/1938 | Miller | 308/4 R |
| 3,465,323 | 9/1969 | Horsefall et al | 308/5 R |
| 3,482,232 | 12/1969 | Farrand | 308/5 R |

Primary Examiner—Charles J. Myhre
Assistant Examiner—R. H. Lazarus
Attorney, Agent, or Firm—Herbert L. Lerner

[57] ABSTRACT

Shaft bearing assembly of a machine tool having a shaft that bends under the weight of components mounted thereon and that is both rotatable and longitudinally slidable in a bearing includes a bearing of given length through which the shaft extends, and a diametrically extending bulge on the shaft, the bulge having a surface engaging the bearing and being slidably displaceable with the shaft over a maximum longitudinally extending distance shorter than the given length of the bearing.

6 Claims, 2 Drawing Figures

PATENTED SEP 17 1974 3,836,210

SHAFT BEARING ASSEMBLY OF A MACHINE TOOL

This is a continuation of application Ser. No. 99,576, filed Dec. 18, 1970, now abandoned.

The invention relates to a shaft bearing assembly of a machine tool and especially to such bearing assembly for a shaft which bends under the weight of components that are mounted thereon and that is both rotatable and longitudinally slidable in a bearing.

The shaft can be, for example, a turret shaft or the workpiece spindle of a turret lathe. The shaft is supposed to sustain the weight proper of the components, such as the tool turret or the workpiece-clamping chuck, which are mounted thereon, but should also form a counterbearing against the forces that act between tool and workpiece during the turning, boring, milling and other operations performed by the machine tool. These forces, as a rule, have a very large azimuthal component with respect to the shaft. These force components primarily cause the shaft to bend relatively easily during operation of the machine tool. With a floating bearing, this bending is substantially proportional to the third power of the distance between the bearing and the point of application of the tool performing the turning, boring, milling or similar operation. With a turret or spindle shaft that is longitudinally displaceable in the bearing, the being varies with the feed of the turret tool or the workpiece, respectively, so that when performing a turning operation, the workpiece is formed with a conical cross section instead of a cylindrical cross section, for example, Thus, the bending proper does not cause any trouble but rather the variation in the bending in the course of the feed of the tool with respect to the workpiece, during operation of the machine tool. The bending can, of course, be reduced by reinforcing or beefing up the respective shaft, but cannot be eliminated entirely.

It is accordingly an object of the invention to provide shaft bearing assembly of a machine tool with means which avoid the aforementioned basic disadvantages produced by the bending of the shaft without actually eliminating the bending per se.

With the foregoing and other objects in view, there is provided in accordance with the invention, shaft bearing assembly for a machine tool having a shaft that bends under the weight of components mounted thereon and that is both rotatable and longitudinally slidable in a bearing, comprising a bearing of given length through which the shaft extends, and a diametrically extending bulge on the shaft, the bulge having a surface engaging the bearing and being slidably displaceable with the shaft over a maximum longitudinally extending distance shorter than the given length of the bearing.

In accordance with further features of the invention, when the shaft is supported in a plurality of bearings, the bearing-engaging surface is provided on respective diametrically extending bulges on the shaft. Further in accordance with the invention, the diametrically extending bulge is formed by a cylindrical bushing firmly seated on the shaft. Both slide bearings as well as roller bearings may be employed as the cylindrical bushing. Care must be taken, above all, when coordinating and shaping the bearing and the bulge, that at least the edge of the bulge closer to or facing the components, such as a turret or workpiece chuck, for example, which are carried by the shaft, bears on or engages the bearing along the entire path of travel of the shaft in the course of the operative movement thereof. The distance between this edge and the location at which the turning, cutting, boring, milling or similar operation of the machine tool is carried out is then constant. Therefore, the bending does not vary in the course of the operative movement and can, therefore, no longer exert any disrupting influences upon the operative reliability of the machine tool when the constant value of the bending of the shaft is taken into acount when setting the machine tool. Surprisingly, the shaft bearing assembly of the invention also provides advantages for the shaft proper.

Heretofore, efforts were made to provide engaging or bearing surfaces of the shaft and bearing boxes with the greatest possible length, especially for rotary machine tools with floating bearing of the tool turret and workpiece spindle. When the shaft bends slightly, which obviously occurs also within the bearing, the bearing and the shaft are then nonuniformly stressed or loaded due to the so-called edgewise supporting contact (Kantentrag) so that relatively high friction occurs therebetween. Due to the relatively short engagement surfaces of the shaft bearing assembly of the invention, the nonuniform loading or stressing of the edges of the bearing, i.e., the edgewise supporting contact (Kantentrag), becomes negligibly small.

Other features which are considered as characteristic for the invention are set forth in the appended claims.

Although the invention is illustrated and described herein as embodied in shaft bearing assembly or a machine tool, it is nevertheless not intended to be limited to the details shown, since various modifications and structural changes may be made therein without departing from the spirit of the invention and within the scope and range of equivalents of the claims.

Figure 2:
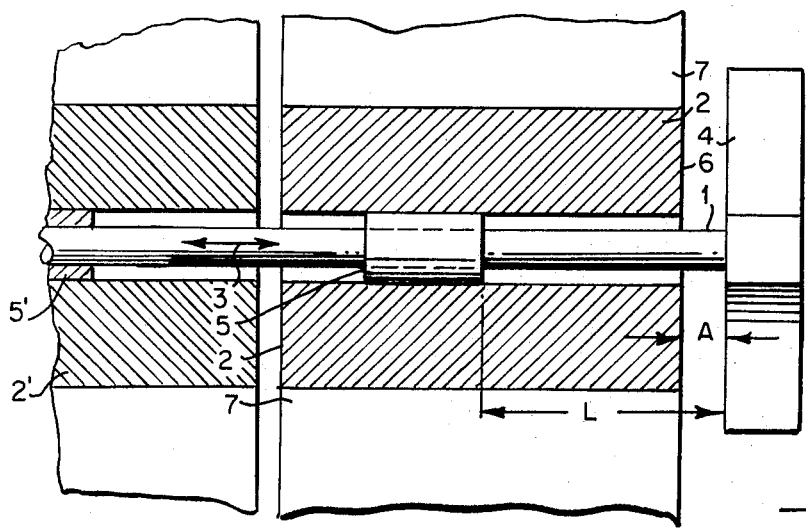

The construction and method of operation of the invention, however, together with additional objects and advantages thereof will be best understood from the following description of specific embodiments when read in connection with the accompanying drawings, in which:

FIGS. 1 and 2 are fragmentary sectional views of a machine tool including the shaft bearing assembly of the invention and wherein the shaft is shown in two different stages withing the bearing.

Referring now to the drawing, there is shown a turret shaft 1, which is longitudinally slidable in the direction of the double-headed arrow 3 within a bearing 2 of a machine tool, such as a turret lathe, for example. The turret shaft carries at one end thereof a turret beam 4 on which nonillustrated tools are suitably mounted. In accordance with the invention, a diametrically extending bulge in the form of a cylindrical bushing or sleeve 5 is fixedly mounted on the turret shaft 1, so that the length L in any position of the turret shaft is the same. This length had to be measured heretofore, without the use of the diametrically extending bulge of the invention, between the edge 6 of the bearing and the turret beam 4. The length of the last-mentioned distance, which is identified as the distance A in the figures of the drawing, depended, however, upon the respective position of the turret axis (as can be plainly seen from FIGS. 1 and 2). The abovementioned disadvantages deriving therefrom are avoided by the invention of the instant application, namely due to the ever constant length L of the distance between the edge of the bulge 5 and the turret beam 4.

If, as shown in the figures, the turret shaft 1, in addition to the bearing 2, is mounted in one or more additional bearings located to the right-hand or left-hand side of the turret beam 4, such as the additional bearing 2′, it is similarly advantageous, in accordance with the invention, to employ a diametrically extending bulge or sleeve 5′ mounted on the shaft 1 so that the effective distance ratio of bearing to bearing or turret beam is constant.

The shaft bearing assembly of the invention is especially advantageous for use with a turret shaft of a turret lath having a floating bearing, when the turret is formed of a vertically extending beam that is pivotable about an angle of 180°, and the workpiece spindle adjacent the turret shaft extends parallel thereto and is located substantially at the same level therewith in the machine block.

I claim:

1. A turret machine tool including a shaft bearing assembly having a shaft which is subject to intermittent tilting under the weight of a component mounted thereon and which is at the same time rotatable and longitudinally slidable, said shaft bearing assembly further comprising a bearing of given longitudinal length through which said turret shaft extends, and a diametrically extending bulge on the turret shaft, said bulge having a surface engaging the bearing and being slidably displaceable with the turret shaft over a maximum longitudinally extending distance shorter than the given longitudinal length of the bearing so that the tilt factor of the turret shaft remains constant.

2. A turret machine tool according to claim 1 including a plurality of bearings, said turret shaft extending through said plurality of bearings and having one of said diametrically extending bulges thereon within each of said bearings.

3. A turret machine tool according to claim 1, wherein said diametrically extending bulge is formed by a cylindrical bushing firmly seated on the turret shaft.

4. A turret machine tool according to claim 1 wherein said bearing is a floating bearing.

5. A turret machine tool according to claim 1 wherein said diametrically extending bulge is mounted on a turret shaft comprising a workpiece spindle.

6. A turret machine tool including a shaft bearing assembly and having a turret shaft which is subject to intermittent tilting under the weight of a component mounted thereon and which is at the same time rotatable and longitudinally slidable, said shaft bearing assembly further comprising a bearing means of given longitudinal length, a turret shaft slidably and rotatably disposed in said bearing means and having an end portion extending beyond one longitudinal end of said bearing means, said component being mounted on said end portion of said turret shaft, a diametrically extending bulge on said turret shaft and having a diameter greater than the remaining portion of the turret shaft which is disposed in said bearing means, said bulge engaging said bearing means to rotatably and slidably support said turret shaft in said bearing means, said bulge and turret shaft being slidably advanceable in said bearing means whereby the longitudinal distance between said component and said bulge on said turret shaft remains constant at all times to provide a constant tilt factor independent of a varying distance between said component and said one longitudinal end of said bearing means during said advancement.

* * * * *

UNITED STATES PATENT OFFICE
CERTIFICATE OF CORRECTION

Patent No. 3,836,210              Dated September 17, 1974

Inventor(s) EBERHARD VAN HORST

It is certified that error appears in the above-identified patent and that said Letters Patent are hereby corrected as shown below:

In the heading to the printed specification, after line 8, insert:

--Foreign Application Priority Data

December 20, 1969    Germany........P 19 64 034.7--

Signed and Sealed this

*fourth* Day of *November 1975*

[SEAL]

Attest:

RUTH C. MASON
*Attesting Officer*

C. MARSHALL DANN
*Commissioner of Patents and Trademarks*